2,998,453
PHENOXY DIPHENYL SULFONES AND
THEIR PREPARATION
George M. Nichols, Pitman, N.J., assignor to E. I. du
Pont de Nemours and Company, Wilmington, Del.,
a corporation of Delaware
No Drawing. Filed June 22, 1960, Ser. No. 37,828
5 Claims. (Cl. 260—607)

The present invention relates to novel substituted diphenyl sulfones. More specifically, the present invention relates to novel diphenyl sulfones containing ether linkages.

The new compounds of the present invention are of the general formula

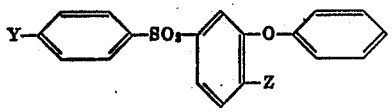

wherein Y and Z are selected from the group consisting of hydrogen and phenoxy radicals, with the proviso that when Y is a phenoxy radical, Z is a phenoxy radical. The novel compounds are 3-phenoxydiphenyl sulfone, 3,4-diphenoxydiphenyl sulfone, and 3,4,4'-triphenoxydiphenyl sulfone. The novel compounds are noncrystalline products possessing unusually wide liquid ranges combined with high thermal stability. For this reason, they are valuable as lubricants, hydraulic fluids, dielectric fluids, heat-transfer media, and special-purpose additives, such as plasticizers for high-temperature materials. Among other uses, they are low-volatility, high-temperature, stable, liquid-phase solvents for gas chromatography.

I prefer to prepare the novel compounds by the reaction of a halogenated diphenyl sulfone with the potassium salt of phenol in the presence of a copper catalyst at elevated temperatures. Although the following examples illustrate this preferred method, the preparation of the novel compounds is not limited to the specific embodiments set forth therein. Parts in the examples are parts by weight.

EXAMPLE 1

Preparation of 3-phenoxydiphenyl sulfone

A mixture of 130.8 parts of 3-bromodiphenyl sulfone, 52 parts of phenol, 31 parts of potassium hydroxide, and 2 parts of copper powder was charged to a 500-ml., 3-necked, "Pyrex" flask fitted with thermometer, stirrer, and condenser. The mixture was heated slowly to 200° C., while allowing the water vapor that formed to escape. Heating continued at 200° C. for 1½ hours and 215° C. for 2½ hours. The mixture was cooled to approximately 150° C., poured into 500 ml. of 5% aqueous potassium hydroxide, and extracted with two 400-ml. portions of benzene. The desired reaction product dissolved in benzene was then washed with two 500-ml. portions of 10% aqueous potassium hydroxide, slurried with charcoal, and filtered. After the filtrate was washed again with two 500-ml. portions of 10% sodium sulfate solution, the benzene was evaporated, the crude product was distilled, and thirty-six parts of a noncrystalline product was collected. The product had a pour point of 23° C. and a boiling point of 460° C. at atmospheric pressure. Infrared analysis showed the presence of the sulfonyl linkage and ether linkage. The elemental analysis was as follows:

C_____ 69.77
H_____ 4.72
S_____ 9.80

Calculated for $C_{18}H_{14}O_3S$: C, 69.66; H, 4.54; S, 10.33.

The elemental content of the compound therefore agreed closely with that calculated for $C_{18}H_{14}O_3S$. Thus, the compound was shown to be 3-phenoxydiphenyl sulfone:

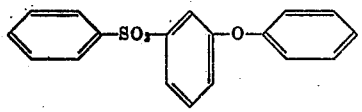

The new compound underwent only a very slight change when it was placed in an evacuated, sealed "Pyrex" tube and subjected to a temperature of about 450° C. for 10 hours.

EXAMPLE 2

Preparation of 3,4-diphenoxydiphenyl sulfone 3,4-dichlorodiphenyl sulfone (108 parts) was added to a mixture of 110 parts of potassium phenoxide and 10 parts of copper powder maintained at a temperature between 230 and 245° C. in a 500-ml., 3-necked, "Pyrex" flask fitted with thermometer, stirrer, and condenser. The reaction was continued at 234° C. for 1 hour, after which the mixture was cooled to about 150° C. The mixture was poured into 1 liter of 5% aqueous potassium hydroxide with vigorous stirring and extracted with three 400-ml. portions of benzene. The extract was washed and treated as in Example 1, the benzene was evaporated, and the crude product was distilled. Seventy parts (about 46% conversion) of a yellow, noncrystalline product was obtained. The product had a pour point of 40° C. and a boiling point of 513° C. at atmospheric pressure. Infrared analysis of the product showed the presence of the sulfonyl linkage and the ether linkages. The elemental analysis was as follows:

C_____ 71.76
H_____ 4.49
O_____ 15.98
S_____ 7.79

Calculated for $C_{24}H_{18}O_4S$: C, 71.61; H, 4.52; O, 15.90; S, 7.97. Thus, the compound was shown to be 3,4-diphenoxydiphenyl sulfone:

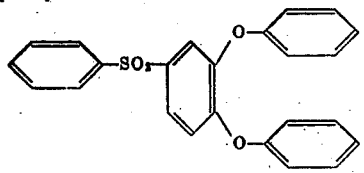

The new compound exhibited no change when it was placed in an evacuated, sealed "Pyrex" tube and subjected to a temperature of about 450° C. for 10 hours.

EXAMPLE 3

Preparation of 3,4,4'-triphenoxydiphenyl sulfone

In a 5-liter, 3-necked, "Pyrex" flask fitted with thermometer, stirrer, and condenser were mixed 1,363.7 parts of 3,4,4'-trichlorodiphenyl sulfone, 1,800 parts of phenol, and 980 parts of potassium hydroxide. Upon warming the mixture, a vigorous exothermic reaction took place. The mixture was heated slowly to 215° C. while collecting the water of reaction, and 10 parts of copper powder was added. The mixture was heated to 255° C., and after an additional 25 parts of copper powder was added, the reaction was continued for 19 hours at 250–260° C. The mixture was then cooled to about 180° C., and poured into 3 liters of 5% aqueous potassium hydroxide. The mixture was extracted with 2.1 liters of benzene, washed with two 2-liter portions of 10% aqueous potassium hydroxide, and washed again with two 2-liter portions of 10% sodium sulfate solution. After the mixture was allowed to stand for 18 hours over 226 parts of anhydrous sodium sulfate, it was filtered, slurried with charcoal, and filtered again. The benzene was evaporated, the crude product was distilled, and 890 parts of a red, noncrystalline product was collected. The product was dissolved in 1 liter of benzene, slurried with charcoal, filtered, the benzene was evaporated, and the product was again distilled. A yellow, noncrystalline product (802 parts) was obtained. The product had a pour point of 57° C. and a boiling point of 550° C. at atmospheric pressure. Infrared analysis showed the presence of the sulfonyl linkage and the ether linkages. The elemental analysis was as follows:

C ------------------------------------------- 73.08
H ------------------------------------------- 4.51
O ------------------------------------------- 15.80
S ------------------------------------------- 6.66

Calculated for $C_{30}H_{22}O_5S$: C, 72.85; H, 4.49; O, 16.18; S, 6.48. Thus, the compound was shown to be 3,4,4'-triphenoxydiphenyl sulfone:

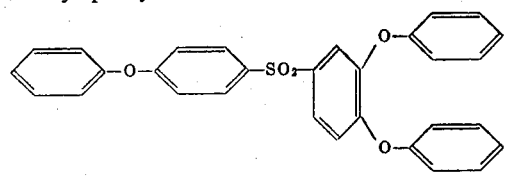

There was no change in the new compound when it was placed in an evacuated, sealed "Pyrex" tube and subjected to a temperature of about 450° C. for 10 hours.

As shown by the examples, the new compounds may be prepared readily by the reaction of the appropriate halogenated sulfone with the potassium salt of phenol in the presence of a copper catalyst at elevated temperatures. The potassium salt of phenol may be prepared prior to its reaction with the halogenated diphenyl sulfone, or it may be formed in the reaction mixture from phenol and potassium hydroxide. It is essential that copper powder be present as the catalyst. The copper is present in catalytic amounts, and, preferably, a greater than stoichiometric amount of potassium phenoxide is used. The reactants are heated to a temperature sufficient to effect the reaction, and maintained at that temperature until the reaction is complete. I have found that temperatures in excess of 200° C. are required in order to provide a reasonable reaction time. When potassium phenoxide is prepared in the reaction mixture, a preferred embodiment, the heating step is accompanied by the removal of the water of reaction. After formation of the ether is complete, I prefer to cool the mixture in order to facilitate its addition to the potassium hydroxide solution. The reaction mixture is then extracted in benzene or another common organic solvent and rewashed with basic and salt solutions to completely remove water-soluble reaction products. After the solvent is evaporated, the residue is distilled and the pure compound is obtained.

The following table is a compilation of the pour points, boiling points, and liquid ranges of the novel compounds of the present invention. The pour point is the lowest temperature at which the compound will flow at atmospheric pressure in a 13 mm. test tube.

| Compound | Pour Point, °C. | Boiling Point, °C. | Liquid Range, °C. |
|---|---|---|---|
| 3-Phenoxydiphenyl sulfone | 23 | 460 | 437 |
| 3,4-Diphenoxydiphenyl sulfone | 40 | 513 | 473 |
| 3,4,4'-Triphenoxydiphenyl sulfone | 57 | 550 | 493 |

All of the above are thermally stable at a temperature of 450° C. as shown in the examples. The new compounds are also relatively inert chemically, soluble in most organic solvents, and insoluble in water. The above combination of properties makes these compounds of considerable value as thermally stable liquids for many applications.

The new compounds and their preparation have been described in detail in the foregoing. However, it will be obvious to those skilled in the art that modifications in their preparation are possible without departure from the scope of the invention. Therefore, I intend to be limited only by the following claims.

I claim:
1. A compound having the formula

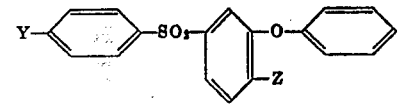

wherein Y and Z are selected from the group consisting of hydrogen and phenoxy radicals, with the proviso that when Y is a phenoxy radical, Z is a phenoxy radical.

2. 3-phenoxydiphenyl sulfone.
3. 3,4-diphenoxydiphenyl sulfone.
4. 3,4,4'-triphenoxydiphenyl sulfone.
5. A process for preparing a compound of the class consisting of 3-phenoxydiphenyl sulfone, 3,4-diphenoxydiphenyl sulfone, and 3,4,4'-triphenoxydiphenyl sulfone which comprises reacting the potassium salt of phenol with a halogenated diphenyl sulfone from the class consisting of 3-halodiphenyl sulfone, 3,4-dihalodiphenyl sulfone, and 3,4,4'-trihalodiphenyl sulfone, respectively, in the presence of a copper catalyst at a temperature of 200° C. to 450° C.

References Cited in the file of this patent
UNITED STATES PATENTS
2,069,774    Reid ---------------- Feb. 9, 1937